No. 868,883. PATENTED OCT. 22, 1907.
E. G. O'DONNELL, DEC'D.
J. J. O'DONNELL, ADMINISTRATOR.
HUB WRENCH.
APPLICATION FILED MAY 5, 1906.
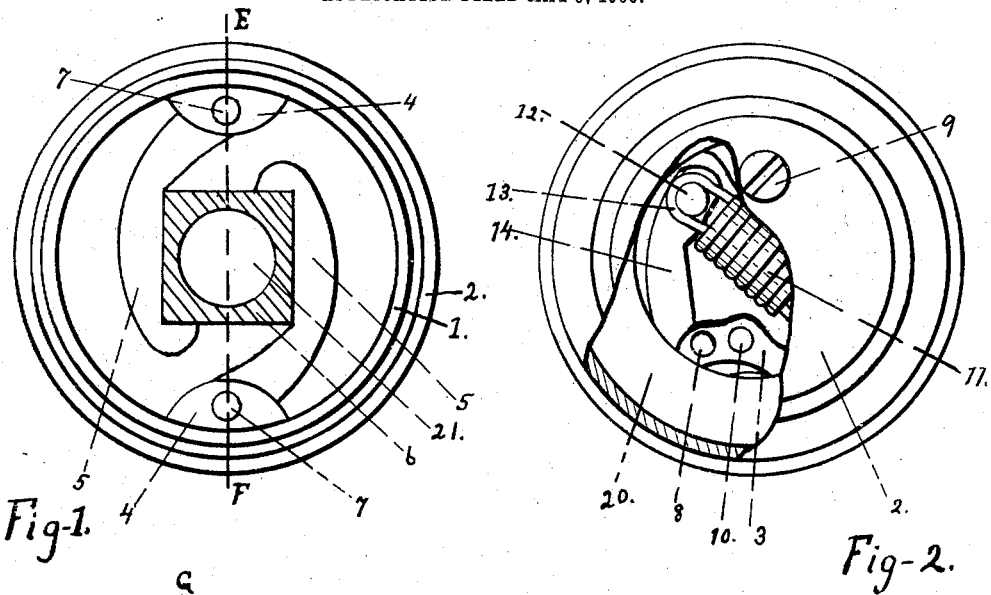
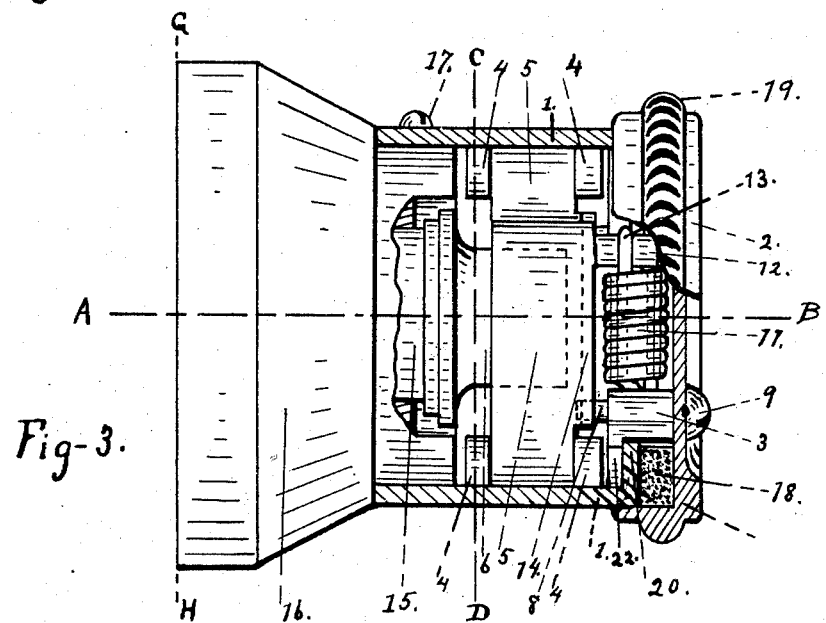
WITNESSES:
Edmond Gregory O'Donnell.
INVENTOR.

UNITED STATES PATENT OFFICE.

EDMOND GREGORY O'DONNELL, OF SOMERVILLE, MASSACHUSETTS, ASSIGNOR OF ONE-HALF TO JOHN JOSEPH O'DONNELL, OF SOMERVILLE, MASSACHUSETTS; JOHN JOSEPH O'DONNELL, ADMINISTRATOR OF SAID EDMOND GREGORY O'DONNELL, DECEASED.

HUB-WRENCH.

No. 868,883.          Specification of Letters Patent.          Patented Oct. 22, 1907.

Application filed May 5, 1906. Serial No. 315,402.

*To all whom it may concern:*

Be it known that I, EDMOND GREGORY O'DONNELL, a citizen of the United States, residing at Somerville, in the county of Middlesex and State of Massachusetts, have invented a new and useful Hub-Wrench or Nut Removing and Replacing Device for Vehicle-Hubs, of which the following is a specification.

My invention relates to an improved means of removing and replacing the nut on a carriage axle.

The objects of my invention are: first, to provide a means, held permanently in the band of the hub of a carriage wheel, to remove and replace the nut; second, to hold it against the end of the "boxing" to prevent the loss of the nut washer; third, to keep in the grease; fourth, to keep out sand and dirt; fifth, to give an ornamental finish to the end of the hub. I attain these objects by the mechanism illustrated in the accompanying drawings, in which Figure 1 is an inside elevation, as though looking from A to B in Fig. 3, with the nut No. 6 in section on the line C, D. Fig. 2 is an outside elevation, as though looking from B to A in Fig. 3, with part of the cap No. 2 broken away to show the inside parts. Fig 3 is a side elevation partly in section on line E, F, Fig. 1, with such parts in section as will best show their co-relation.

Similar numbers refer to similar parts in all views.

I provide a band No. 1 to go on the outer end of a carriage wheel hub, similar to bands now in use, but with four lugs on its inner surface No. 4—No. 4—No. 4—No. 4, (see Fig. 1 and Fig. 3) and a flange No. 20 at its outer end (see Figs. 2 & 3), all part of the band. Two pawl shaped jaws No. 5—No. 5 with cam edged flanges No. 14, and provided with studs No. 12, swing between each pair of lugs No. 4—4 on the pins No. 7—7. A spring No 11, with its looped ends No. 13 looped over the stud No. 12 of each jaw, holds them in operative position while the nut No. 6 is being removed and replaced. The jaws are moved out of operative position by a quarter revolution of the revoluble ring No. 22 with its lugs No. 3—No. 3 and pins No. 8—No. 8 which touch the cam surfaces of the flanges No. 14 of the jaws No. 5—No. 5. The cap No. 2 is provided, first, to turn the ring No. 22 and thus open or shut the jaws; second, to compress the felt washer No. 18 to stop rattling; and third, to keep in (in conjunction with the compressed felt washer) the grease while shutting out sand or dirt. This cap is attached to the lugs No. 3—3 of the ring No. 22 by the screws No. 9—9—No. 10 being the hole in the lug No. 3 for the screw No. 9.

No. 16 is part of the hub of a carriage wheel cut off on the line G, H, and broken away near nut to show the boxing No. 15.

No. 21 is the hole in the nut.

No. 17 is one of the three or four wood screws by which the band is secured to the hub.

The device shown is for a "right thread" nut and is operated as follows:—The cap is grasped by its knurled edge No. 19 and turned a quarter revolution from right to left; this allows the jaws to be pulled into operative position by the spring. The wheel is then turned from right to left until the nut is off, the jaws holding the nut and its washer secure until released. To replace the wheel it is turned from left to right, with a fast movement, and as soon as the nut is tight against its "seat" the jaws slip past the corners of the nut, making a noise, As the jaws slip past the corners, the spring causes them to strike a blow on two corners of the nut in a direction to tighten it. These blows will seat it, if the spring is of sufficient size, yet not injure the device or the end of the hub to which it is attached as would be the case if the nut was positively held by some means. Then to move the jaws out of operative position the cap is turned from left to right and remains in that position while the carriage is in use. For a "left thread nut" the jaws and mode of operating are reversed.

I am aware that many attempts have been made to make a practical hub wrench, and several have been patented. But, Having described my invention, I claim as new features, 1. In a hub wrench, the combination with a band, for the outer end of a vehicle hub, having an inwardly projecting flange at its outer end, of two pairs of lugs projecting vertically inward from the inner surface of the band and forming a part of it, and a pair of pawl shaped jaws fulcrumed on pins between said lugs, as shown and described.

2. In a hub wrench, the combination with a band, having two pairs of lugs projecting vertically inward, a flange at the outer end of said band projecting vertically inward, of a cap having a horizontal flange fitting loosely over the end of said band, and a knurled rib encircling said cap as shown and described.

3. In a hub wrench, the combination with a band, having lugs projecting vertically inward, a flange projecting vertically inward, a cap having a horizontal flange and a knurled encircling rib, of a means to attach said cap to the band, in a rotary movable position. Said means consisting of—a ring revoluble between the two pairs of lugs and the flange at the outer end of the band, and having horizontally projecting lugs, to which the cap is secured by two screws, as shown and described.

4. In a hub wrench, the combination with a band, having two pairs of lugs projecting vertically inward, a flange projecting vertically inward, a cap attached to a revoluble ring, of a separating felt washer, interposed between the said cap, and the vertical flange, of said band, as shown and described.

5. In a hub wrench, the combination with a band, having two pairs of lugs projecting vertically inward, of a pair of pawl shaped jaws, movable between the lugs, and swinging on two pins which pass through the lugs and ends of the jaws, as shown and described.

6. In a hub wrench, the combination with a band having two pairs of lugs projecting vertically inward, a pair of pawl shaped jaws, of a cam edged flange on each jaw as shown and described.

7. In a hub wrench, the combination with a band, having two pairs of lugs projecting vertically inward, a flange projecting vertically inward, and a pair of pawl shaped jaws, with cam edged flanges, of a close coiled spring, with looped ends, looped over studs horizontally projecting outward from each jaw, to hold them in operative position, as shown and described.

8. In a hub wrench, the combination with a band, having two pairs of lugs, projecting vertically inward, a flange projecting vertically inward, a pair of pawl shaped jaws, with cam edged flanges, a close coil spring looped over studs horizontally projecting outward from each jaw, of a nut screwed on the end of an axle, and tightly held by said jaws, as shown and described.

9. In a hub wrench, the combination with the outer band of a vehicle wheel hub, having two pairs of lugs, projecting vertically inward, a flange projecting vertically inward, and a pair of swinging pawl shaped jaws, with cam edged flanges, held tightly in operative position, on a nut, screwed on the end of an axle, by a close coiled spring, looped over projecting studs, on each jaw; a cap with a knurled rib, encircling it and a flange extending horizontally inward, over the outer end of the said band, and said cap attached by two screws to two horizontal, outwardly extending lugs on a revoluble ring, revoluble between the said two pairs of lugs and the said flange of the said band; two pins projecting horizontally inward, from said ring and in contact with the cam edged flanges of said jaws, to spread the jaws apart by a partial revolution of the ring and attached cap, and with a felt washer interposed between the cap and the vertical flange of said band, as shown and described.

Signed at Boston this the fourth day of May 1906, in presence of two witnesses.

EDMOND GREGORY O'DONNELL.

Witnesses:
ARTHUR R. SURPLUSS,
JOHN A. LAVENDER.